Patented Dec. 11, 1928.

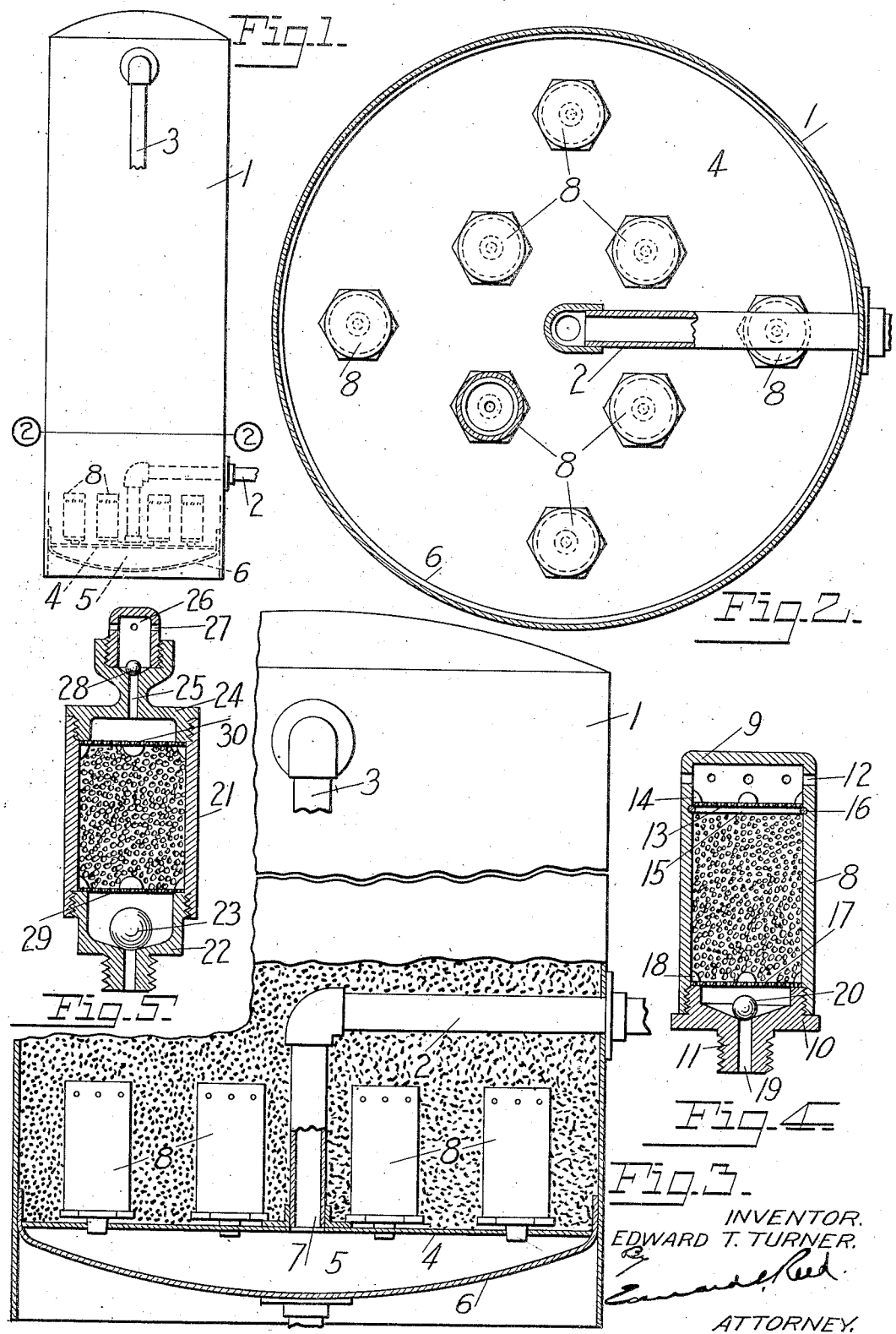

1,694,804

UNITED STATES PATENT OFFICE.

EDWARD T. TURNER, OF DAYTON, OHIO.

WATER-SOFTENING APPARATUS.

Application filed June 13, 1925. Serial No. 36,839.

This invention relates to a water softening apparatus and more particularly to a water softening apparatus of that type which employs as the water softening agent a substance, such as zeolite or glauconite, having the property of exchanging its natural base for the substances which harden the water.

In an apparatus of this kind it is desirable that the water to be softened be caused to flow substantially uniformly through all parts of the water softening material and to this end it has been customary to interpose between the supply pipe and the water softening material a bed of gravel, and various devices have been provided for introducing the water into the bed of gravel in such a manner as to cause it to be delivered uniformly to all parts of the water softening material. These devices, however, have not been entirely satisfactory because if one portion of the bed of water softening material offers a greater resistance to the flow of the water than does another part of the bed of material, the water will follow the line of least resistance and will therefore come in contact with a portion only of the water softening material and the efficiency of the apparatus will be correspondingly reduced. If such an apparatus is allowed to stand idle for any length of time, even over night, the water softening material will settle down and pack to a greater or lesser extent and it frequently happens that the material will pack harder in one portion of the container than in another, thus offering a greater resistance to the flow of water through that portion of the material than through the portion thereof which is not packed so hard. The tendency of the water to follow the line of least resistance prevents it from working its way through the harder portions of the material and consequently these portions are not loosened up or softened so as to permit the passage of water therethrough.

One object of the invention is to provide a water softening apparatus having means for so introducing water into the water softening material as to cause the same to flow substantially uniformly through all parts thereof.

A further object of the invention is to provide such an apparatus having means for introducing the water to be softened under pressure directly into the water softening material and to so maintain the pressure as to cause any tightly packed portion of the water softening material to be loosened.

A further object of the invention is to provide such an apparatus in which the means for introducing the water into the water softening material will be of such a character as to prevent the water softening material from escaping through the same into the inlet passageway or chamber, but will permit any sediment to pass through the same with the water.

A further object of the invention is to provide such a device which will be simple in its construction, easy to install and which can be produced at a relatively low cost.

Other objects of the invention will appear as the apparatus is described in detail.

In the accompanying drawings Fig. 1 is an elevation of a water softening apparatus embodying my invention; Fig. 2 is a section taken on the line 2—2 of Fig. 1, with the supply pipe and one of the discharge heads broken away; Fig. 3 is a section taken centrally through the lower portion of such a water softening device with the upper portion of the container in elevation; Fig. 4 is a sectional detail view of one of the discharge heads; and Fig. 5 is a sectional detail view of a modified form of discharge head.

In these drawings I have illustrated one embodiment of my invention and have shown the same as applied to a water softening apparatus comprising a container 1 adapted to contain a water softening material and having at its lower end a supply pipe 2 and at its upper end an outlet pipe 3. The supply pipe and outlet pipe may be arranged in any suitable location and the flow of water through the supply pipe and container may be controlled in any suitable manner, for example, as shown in my co-pending application for Patent Serial No. 11,435, filed February 25, 1925.

In carrying out the invention I interpose between the supply pipe 2 and the water softening material in the container a plurality of discharge devices which communicate with the supply pipe and are so arranged that they will discharge the water directly into the mass of water softening material. The character of these discharge devices is such that substantial pressures will be maintained on the several discharge devices regardless of any inequalities in the resistance offered to the escape of the water from the discharge devices, as when the material is packed more tightly about one discharge device than about another. Preferably the arrangement is such that the drop in pressure between the supply pipe and the container will increase when abnormal resistance is offered to the escape of the water from one or more of the discharge devices.

In that embodiment of the invention here shown, in which the water to be softened flows upwardly through the water softening material, I have mounted in the lower portion of the container 1 a partition 4 which extends transversely thereto and is spaced from the bottom wall of the container so as to provide a chamber 5. In the present instance, the bottom wall 6 of the container is concave and the partition is supported at its peripheral edge on the outer portions of this bottom wall, it being tightly secured thereto in any suitable manner, as by welding. The supply pipe is shown as entering the container above the partition and communicating with the partition 5 through an opening 7 arranged centrally of the partition. The discharge devices are here shown in the form of discharge heads 8 mounted on the partition 4 and communicating with the chamber 5. The discharge heads extend into the mass of water softening material which, in the present arrangement, rests upon the partition 4, the usual bed of gravel being omitted. The discharge heads may be of any suitable character but in the preferred form each head comprises a receptacle adapted to contain a body of fine gravel and provided at its lower end with an inlet to connect the same with the chamber 5 and at its upper end with an outlet or outlets to discharge into the mass of water softening material. As here shown, the receptacle forming the body of the discharge head is cylindrical in form and has its upper end closed by a transverse end wall 9, which may, if desired, be integral therewith. The lower end of the cylindrical receptacle is closed by a cap or plug 10 which is screw threaded into the lower portion thereof and has formed integral therewith a nipple 11 adapted to be screw threaded into an opening in the partition 4. The upper portion of the cylindrical body is provided at a point slightly below the top wall 9 thereof with a series of outlets 12 arranged to discharge the water laterally from the discharge head. Mounted in the cylindrical receptacle 8 a short distance below the outlets 12 is a screen or perforated disk 13, which is here shown as supported between lugs 14 extending inwardly from the cylindrical wall of the receptacle 8 and a spring ring 15 seated in a groove 16 beneath the disk. Near the lower end of the receptacle is a second screen or perforated disk 17, which is shown as confined between lugs 18 extending inwardly from the cylindrical wall of the receptacle and the upper edge of the flange of the cap 10. Interposed between the screens 13 and 17 is a body of gravel which is not quite sufficient in quantity to entirely fill the space between the two screens, thus causing the gravel to be loosely supported in the receptacle.

Any suitable number of discharge heads may be employed and these may be arranged in any desired manner in the container but, in the present device, I have utilized eight discharge heads which are distributed substantially uniformly over the partition 4. The nipple 11 of each discharge head is provided with an inlet opening 19 which connects the head with the chamber 5, so that the water from the supply pipe will pass through the several discharge heads and will be discharged laterally therefrom, under pressure, and will be discharged directly into the mass of water softening material which surrounds the several heads. The flow of water through the several discharge heads is so regulated as to maintain the desired drop of pressure between the inlet chamber 5 and the interior of the container for water softening material. This is preferably accomplished by providing each discharge head with a restricted passageway, which may be arranged at any desired point in the head. In that form of discharge head shown in Figs. 3 and 4 the inlet opening 19 is of a size to properly regulate the flow of the water. I prefer to employ in connection with this device a flow regulator, such as is shown in the above mentioned application, so as to maintain a uniform flow of water to the chamber 5, but this is not essential to the proper operation of the device. Should the water softening material be looser in one portion of the container than in another the freer flow of the water through the discharge heads in the loose portion of the material will not tend to reduce the pressure in those heads about which the material is more tightly packed but will tend to increase the pressure drop between the chamber and the container, so that the pressure in the latter heads will be maintained, or increased, and the water forced through the outlet openings 12 thereof. This water will not only force its way through the more tightly packed material but it will displace the material immediately surrounding the discharge head and will thus undermine the overlying portions of the material and the latter will be cause to settle and will be thus loosened so as to permit the free flow of the water therethrough. As a result the device not only distributes the water uniformly to all parts of the water softening material but it also serves to loosen up any tightly packed portions of that material, thereby providing for a free and uniform flow of water through all portions of the water softening material, thus securing a very high degree of efficiency in the apparatus.

It is important that the discharge heads shall be of such a character as to prevent the water softening material, or mineral, from escaping through the same into the inlet chamber but to permit any sediment which may collect in the discharge head to be carried through the same. For this purpose the body of loose gravel is placed in each head and the diameter of each discharge head is such that the pressure of the water passing through the same will lift the gravel sufficiently to permit the passage of the water and of such sediment as may have entered the head. When the flow of water is interrupted the gravel will settle down on the lower screen and prevent the passage of any part of the water softening material which may have entered through the discharge openings. The discharge heads of the present device are also provided with a check valve 20 at the ends of the inlets, which serve as an additional guard against the passage of any water softening material which may have worked its way through the gravel. While I have as a matter of protection used both the gravel and the check valve it will be understood that either the gravel or the check valve may be used, without the other, and satisfactory results secured.

As has been stated the restricted passageway may be located at any suitable point in the discharge head and in Fig. 5 I have shown another form of head which has the restricted passageway at the upper end thereof, near the outlet openings. This discharge head comprises a cylindrical body portion 21 provided at its lower end with a nipple 22, the inlet opening of which is controlled by a ball valve 23. At its upper end the body portion is closed by a cap 24 which is screw threaded into the same and has a narrow neck provided with a restricted passageway or opening 25 which leads into an enlarged upper portion 26 of the cap. The enlarged upper portion of the cap is provided with laterally extending outlet openings 27 which discharge into the body of water softening material. If desired, a check valve 28 may be arranged in the upper portion of the cap 24 to prevent the water softening material from entering the body of the discharge head. Screens 29 and 30 are supported near the upper and lower ends of the body portion 21 and the body of loose gravel is supported between these screens for the same purpose as above described. In this device I have shown not only the gravel but two check valves. It is seldom, however, that it would be necessary to use the two check valves and, as has been above explained, either a single check valve or the body of gravel may be used alone.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a water softening apparatus, a container for water softening material having an outlet for softened water, and means for delivering water to be softened to said container comprising a supply pipe and a plurality of discharge heads supported in the lower portion of said container and extending into said water softening material, each of said discharge heads having a relatively small inlet communicating with said supply pipe and an outlet arranged to discharge the water to be softened directly into said water softening material.

2. In a water softening apparatus, a container for water softening material having an outlet for softened water, and means for delivering water to be softened to said container comprising a supply pipe, a partition extending transversely to said container and spaced from the bottom wall thereof to form a chamber, said supply pipe being arranged to discharge the water to be softened into said chamber, and a plurality of discharge heads supported by said partition and extending into said water softening material, each of said discharge heads having a restricted passageway communicating with said chamber.

3. In a water softening apparatus, a container for water softening material having an outlet for softened water and means for delivering water to be softened to said container comprising a supply pipe, a partition extending transversely to said container and spaced from the bottom wall thereof to form a chamber, said supply pipe being arranged to discharge the water to be softened into said chamber, and a plurality of receptacles mounted on said partition, extending into said water softening material in said container and having outlets leading into said material and also having relatively small inlets to connect the same with said chamber.

4. In a water softening apparatus, a container for water softening material having an outlet for softened water, and means for delivering water to be softened to said container comprising a supply pipe, a partition extending transversely to said container and spaced from the bottom wall thereof to form a chamber, said supply pipe being arranged to discharge the water to be softened into said chamber, a plurality of receptacles mounted on said partition extending into the water softening material in said container and having outlets leading into said material and also having relatively small inlets to connect the same with said chamber, each of said receptacles having means interposed between the inlet and the outlet thereof for preventing the water softening material from passing through the same without preventing sediment from being carried therethrough by the water.

5. In a water softening apparatus, a container for water softening material having an outlet for softened water, and means for delivering water to be softened to said container comprising a supply pipe, a partition extending transversely to said container and spaced from the bottom wall thereof to form a chamber, said supply pipe being arranged to discharge the water to be softened into said chamber, a plurality of receptacles mounted on said partition, extending into the water softening material in said container and having outlets leading into said material and also having inlets to connect the same with said chamber, each of said receptacles having means for supporting a body of gravel therein in spaced relation to the inlet and the outlet thereof.

6. In a water softening apparatus, a container for water softening material having an outlet for softened water, and means for delivering the water to be softened to said container comprising a supply pipe, a partition extending transversely to said container and spaced from the bottom wall thereof to form a chamber, said supply pipe being arranged to discharge the water to be softened into said chamber, a plurality of discharge heads each comprising a hollow body portion and a nipple to support said body portion on said partition, said nipple having an inlet opening therethrough and each discharge head having a plurality of laterally extending outlet openings near the upper end thereof.

7. In a water softening apparatus, a container for water softening material having an outlet for softened water, and means for delivering water to be softened to said container comprising a supply pipe, a partition extending transversely to said container and spaced from the bottom wall thereof to form a chamber, said supply pipe being arranged to discharge the water to be softened into said chamber, a plurality of discharge heads each comprising a cylindrical body portion having its upper end closed and provided at its lower end with an apertured nipple to support the same on said partition, said body portion having a plurality of outlet openings through the cylindrical wall thereof and near its upper end, and screens mounted in said body portion between said apertured nipple and said outlet openings and adapted to confine a body of gravel within said body portion.

8. In a water softening apparatus, a container for water softening material having an outlet for softened water, and means for supplying the water to be softened to said container comprising a supply pipe, a plurality of discharge heads supported in said container and extending into the water softening material therein, each of said heads comprising a hollow body portion having lateral discharge openings near that end thereof which extends into said water softening material and having a relatively small inlet near the other end thereof, and means for connecting the inlets of the several discharge heads with said supply pipe.

9. In a water softening apparatus, a container for water softening material having an outlet for softened water and means for supplying the water to be softened to said container comprising a supply pipe and a plurality of discharge heads supported in said container and extending into the water softening material each of said heads comprising a hollow body portion having lateral discharge openings near that end thereof which extends into said water softening material and having an inlet near the other end thereof, screens mounted in said body portion between said inlet and said openings and spaced one from the other to confine a body of gravel within said head, and means for connecting the inlets of the several discharge heads with said supply pipe.

10. In a water softening apparatus, a container for water softening material having an outlet for softened water, and means for delivering water to be softened to said container comprising a supply pipe, a plurality of discharge devices supported in said container and arranged to discharge directly into the water softening material therein, each of said devices having a relatively small inlet at one end thereof and an outlet at the opposite end thereof, and means for connecting the inlets of the several discharge devices with said supply pipe.

11. In a water softening apparatus, a container for water softening material having an outlet for softened water, and means for delivering water to be softened to said container comprising a supply pipe, a plurality of discharge devices supported in said container and arranged to discharge directly into water softening material therein, each of said devices having a relatively small inlet at one end thereof and an outlet at the opposite end thereof, means for connecting the inlets to the several discharge devices with said supply pipe, and means associated with each of said discharge devices for preventing the passage of water softening material from said outlet to said inlet.

12. In a water softening apparatus, a container for water softening material having an outlet for softened water, and means for delivering water to be softened to said container comprising a supply pipe, a plurality of discharge devices supported in said container and arranged to discharge directly into the water softening material therein, each of said devices having an inlet at one end thereof and an outlet at the opposite end thereof, means for connecting the inlets of the several discharge devices with said supply pipe, and means for loosely supporting a body of gravel within each of said discharge devices and in spaced relation to the inlet and the outlet thereof.

13. In a water softening apparatus, a container for water softening material having an outlet for softened water, and means for delivering water to be softened to said container comprising a supply pipe, a plurality of discharge devices supported in said container and arranged to discharge directly into the water softening material therein, each of said devices having an inlet at one end thereof and an outlet at the opposite end thereof, means for connecting the inlets of the several discharge devices with said supply pipe, and a check valve arranged within each of said discharge devices to close the passageway therethrough when the water pressure is relieved.

14. In a water softening apparatus, a container for water softening material having an outlet for softened water, and means for delivering water to be softened to said container comprising a supply pipe, a plurality of discharge devices supported in said container and arranged to discharge directly into the water softening material therein, each of said devices having an inlet at one end thereof and an outlet at the opposite end thereof, means for connecting the inlets of the several discharge devices with said supply pipe, means for loosely supporting a body of gravel within each of said discharge devices and in spaced relation to the inlet thereof, and a check valve arranged to close the inlet of each of said discharge devices when the water pressure is relieved.

15. In a water softening apparatus, a container for water softening material having an outlet for softened water, and means for delivering water to be softened to said container comprising a supply pipe and a plurality of discharge heads supported in said container and extending into the water softening material therein, each of said discharge heads comprising a hollow body portion having a restricted passageway therethrough and having at one end a discharge opening and at the other end means for connecting the same with said supply pipe.

In testimony whereof, I affix my signature hereto.

EDWARD T. TURNER.